(12) United States Patent
Chen et al.

(10) Patent No.: US 9,702,397 B2
(45) Date of Patent: Jul. 11, 2017

(54) READILY STRETCHABLE/CONTRACTIBLE AND LOCATABLE CANTILEVER SUPPORT FOR TOOL CABINET

(71) Applicant: E-MAKE CO., LTD., Taichung (TW)

(72) Inventors: Kung-Cheng Chen, Taichung (TW); Lung-Chuan Huang, Taichung (TW)

(73) Assignee: E-MAKE CO., LTD., Taichung (TW)

( * ) Notice: Subject to any disclaimer, the term of this patent is extended or adjusted under 35 U.S.C. 154(b) by 0 days.

(21) Appl. No.: 14/878,276

(22) Filed: Oct. 8, 2015

(65) Prior Publication Data

US 2016/0109056 A1    Apr. 21, 2016

(30) Foreign Application Priority Data

Oct. 20, 2014  (TW) .............................. 103218585 U

(51) Int. Cl.
*F16C 11/04*    (2006.01)
*B25H 1/12*     (2006.01)
(Continued)

(52) U.S. Cl.
CPC .............. *F16C 11/045* (2013.01); *B25H 1/12* (2013.01); *B25H 1/16* (2013.01); *F16B 7/10* (2013.01);
(Continued)

(58) Field of Classification Search
CPC ............. F16M 13/02; F16M 2200/063; F16M 2200/06; F16C 11/045; F16B 7/10; B25H 1/16; B25H 1/12
(Continued)

(56) References Cited

U.S. PATENT DOCUMENTS 3,409,261 A * 11/1968 Leporati ................ F16M 11/08
                                                        248/284.1
4,160,536 A *  7/1979 Krogsrud ............... F16M 11/04
                                                        248/123.11
(Continued)

*Primary Examiner* — Muhammad Ijaz
(74) *Attorney, Agent, or Firm* — Guice Patents PLLC

(57) ABSTRACT

A readily stretchable/contractible and locatable cantilever support includes a fixed seat, a first link body, a second link body, a bridge seat, a third link body, a fourth link body, a movable seat, a first length telescopic adjustment device and a second length telescopic adjustment device. One end of the first link body is pivotally connected with the fixed seat. One end of the second link body is pivotally connected with the fixed seat in adjacency to the first link body. The other end of the first link body is pivotally connected with the bridge seat. The other end of the second link body is pivotally connected with the bridge seat. One end of the third link body is pivotally connected with the bridge seat. One end of the fourth link body is pivotally connected with the bridge seat in adjacency to the third link body. The other end of the third link body is pivotally connected with the movable seat. The other end of the fourth link body is pivotally connected with the movable seat. The first and second link bodies are connected with the fixed seat and the bridge seat to form a quadrangular body. The third and fourth link bodies are connected with the bridge seat and the movable seat to form another quadrangular body. Two ends of the first length telescopic adjustment device are respectively pivotally connected with the first link body and the fixed seat. Two ends of the second length telescopic adjustment device are respectively pivotally connected with the third link body and the bridge seat.

8 Claims, 9 Drawing Sheets

(51) Int. Cl.
 *B25H 1/16* (2006.01)
 *F16B 7/10* (2006.01)

(52) U.S. Cl.
 CPC ... *F16M 2200/06* (2013.01); *F16M 2200/063* (2013.01)

(58) Field of Classification Search
 USPC .......... 248/280.11, 276.1, 284.1, 274.1, 585, 248/281.11
 See application file for complete search history.

(56) References Cited

U.S. PATENT DOCUMENTS

| | | | | |
|---|---|---|---|---|
| 4,213,591 A * | 7/1980 | Jaakkola | ................ | F16M 11/10 248/281.11 |
| 4,266,747 A * | 5/1981 | Souder, Jr. | ............. | F16M 11/14 248/123.11 |
| 4,447,031 A * | 5/1984 | Souder, Jr. | ........... | F16M 11/126 248/281.11 |
| 4,682,749 A * | 7/1987 | Strater | .................... | A47B 27/18 188/166 |
| 4,852,842 A * | 8/1989 | O'Neill | ............. | F16M 11/2092 248/123.11 |
| 5,477,283 A * | 12/1995 | Casey | ...................... | B44D 3/00 353/42 |
| 5,505,424 A * | 4/1996 | Niemann | ............... | F16M 11/14 248/288.31 |
| 5,799,917 A * | 9/1998 | Li | .......................... | F16M 11/08 248/284.1 |
| 6,082,552 A * | 7/2000 | Pollock | .................... | B62H 3/12 211/104 |
| 6,491,269 B1 * | 12/2002 | Larson | ..................... | A47C 3/30 248/161 |
| 7,412,776 B2 * | 8/2008 | Iikubo | .................. | A61B 8/4218 248/280.11 |
| 7,464,909 B2 * | 12/2008 | Li | .......................... | F16M 11/08 248/274.1 |
| 7,546,994 B2 * | 6/2009 | Altonji | ................... | F16M 11/06 248/276.1 |
| 7,562,852 B2 * | 7/2009 | Wang | ................. | A47B 21/0314 108/140 |
| 7,597,299 B2 * | 10/2009 | Papendieck | ............. | F16G 11/12 248/281.11 |
| 7,748,666 B2 * | 7/2010 | Oddsen, Jr. | ........... | F16M 11/10 248/123.11 |
| 8,112,896 B2 * | 2/2012 | Ferrari | .................. | B25J 9/1692 33/1 PT |
| 2003/0001056 A1 * | 1/2003 | Ihalainen | ............... | A61B 6/145 248/276.1 |
| 2003/0075653 A1 * | 4/2003 | Li | .......................... | F16M 11/10 248/274.1 |
| 2006/0102819 A1 * | 5/2006 | Li | .......................... | F16M 11/08 248/280.11 |
| 2007/0108355 A1 * | 5/2007 | Li | .......................... | F16M 11/08 248/280.11 |
| 2007/0266912 A1 * | 11/2007 | Swain | ...................... | A47B 9/02 108/145 |
| 2015/0189991 A1 * | 7/2015 | Yang | ....................... | A47B 97/00 248/292.12 |
| 2015/0316199 A1 * | 11/2015 | Moore | ................. | F16M 11/041 248/207 |

* cited by examiner

READILY STRETCHABLE/CONTRACTIBLE AND LOCATABLE CANTILEVER SUPPORT FOR TOOL CABINET

BACKGROUND OF THE INVENTION

1. Field of the Invention

The present invention relates generally to a cantilever support structure, and more particularly to a readily stretchable/contractible and locatable cantilever support.

2. Description of the Related Art

A conventional stretchable/contractible and locatable cantilever support generally includes four link bodies pivotally connected with each other to form a quadrangular linkage mechanism to achieve stretching/contracting function. Another linkage mechanism can be additionally disposed to enlarge the stretching distance.

The conventional four-link cantilever support is generally applied to a table lamp or stand lamp. The locating structure of the four-link cantilever support employs multiple screws at the pivoted sections for tightening the links to a certain extent. When a user applies a force to the four-link cantilever support, the quadrangular linkage mechanism can be stretched or contracted. When the user releases the four-link cantilever support, the quadrangular linkage mechanism is located in a fixed position in a fixed form.

However, the four-link mechanism is tightened by screws. Once the screws fail to properly fasten the four-link mechanism or the weight of the four-link mechanism is greater than the tightening force of the screws, the four-link mechanism can be hardly securely located in a fixed form.

SUMMARY OF THE INVENTION

It is therefore a primary object of the present invention to provide a readily stretchable/contractible and locatable cantilever support. An article box is assembled with the cantilever support for containing therein an article. The cantilever support is readily stretchable/contractible and locatable so that the article can be more freely moved within a larger range and conveniently used.

It is a further object of the present invention to provide the above readily stretchable/contractible and locatable cantilever support. The cantilever support is fixed on a tool cabinet and the article box can be moved to get closer to a working position for conveniently placing a tool or other article in the article box.

To achieve the above and other objects, the readily stretchable/contractible and locatable cantilever support of the present invention includes a fixed seat, a first link body, a second link body, a bridge seat, a third link body, a fourth link body, a movable seat, a first length telescopic adjustment device and a second length telescopic adjustment device. One end of the first link body is pivotally connected with a first connection section of the fixed seat. One end of the second link body is pivotally connected with a second connection section of the fixed seat in adjacency to the first link body. The other end of the first link body is pivotally connected with a third connection section of the bridge seat. The other end of the second link body is pivotally connected with a fourth connection section of the bridge seat. One end of the third link body is pivotally connected with a fifth connection section of the bridge seat. One end of the fourth link body is pivotally connected with a sixth connection section of the bridge seat in adjacency to the third link body. The other end of the third link body is pivotally connected with a seventh connection section of the movable seat. The other end of the fourth link body is pivotally connected with an eighth connection section of the movable seat. Two ends of the first length telescopic adjustment device are respectively provided with a ninth connection section and a tenth connection section, which are respectively pivotally connected with the first link body and the fixed seat. Two ends of the second length telescopic adjustment device are respectively provided with an eleventh connection section and a twelfth connection section, which are respectively pivotally connected with the third link body and the bridge seat. When a user applied a force to the movable seat, the lengths of the first and second length telescopic adjustment devices are changed at the same time or at different time, or the length of one of the first and second length telescopic adjustment devices can be changed, while the length of the other of the first and second length telescopic adjustment devices is unchanged.

The present invention can be best understood through the following description and accompanying drawings, wherein:

DETAILED DESCRIPTION OF THE PREFERRED EMBODIMENTS

Figure 1:
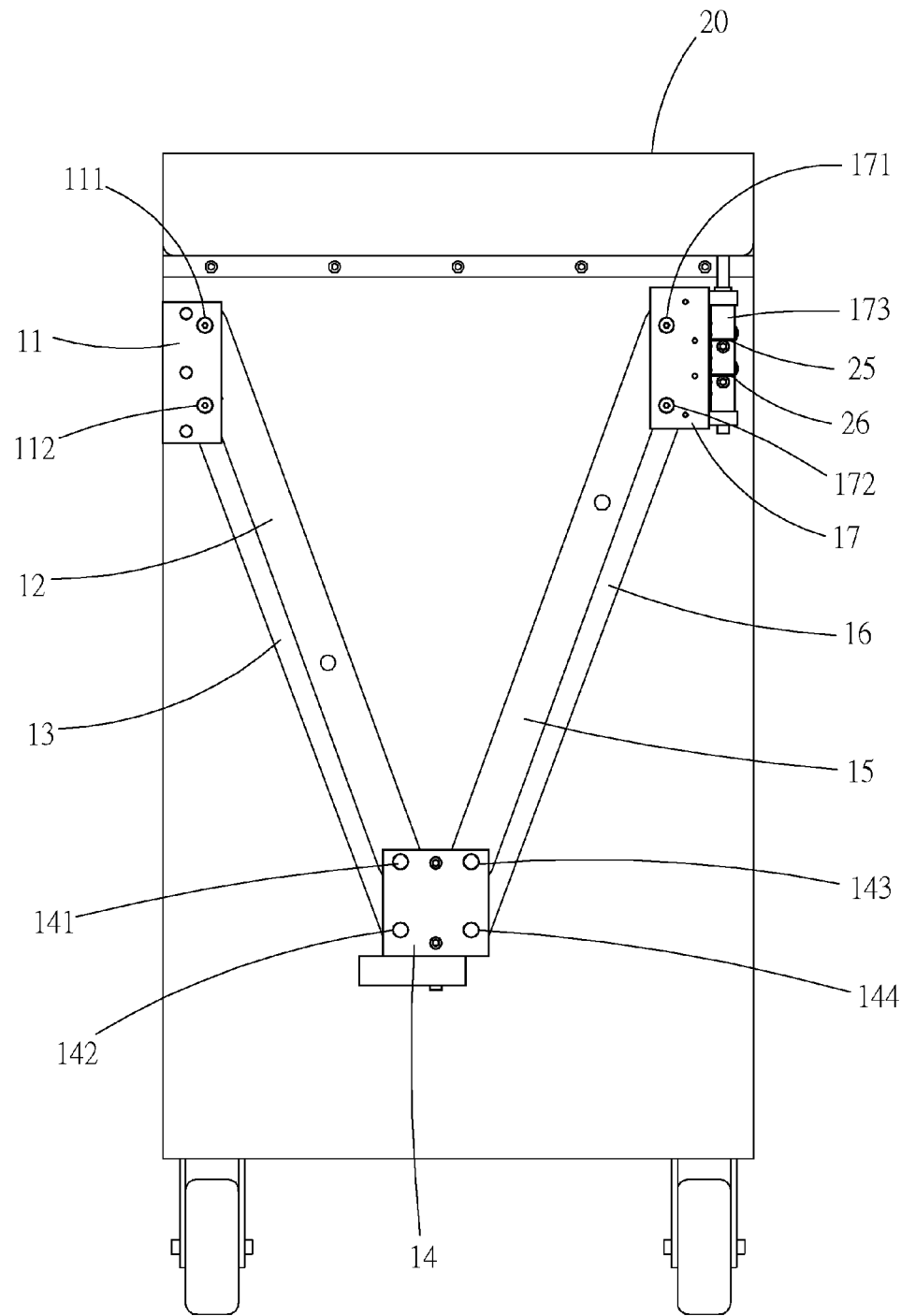
FIG. 1 is a front view of a first embodiment of the present invention, showing that the present invention is mounted on a tool cabinet.
Figure 2:
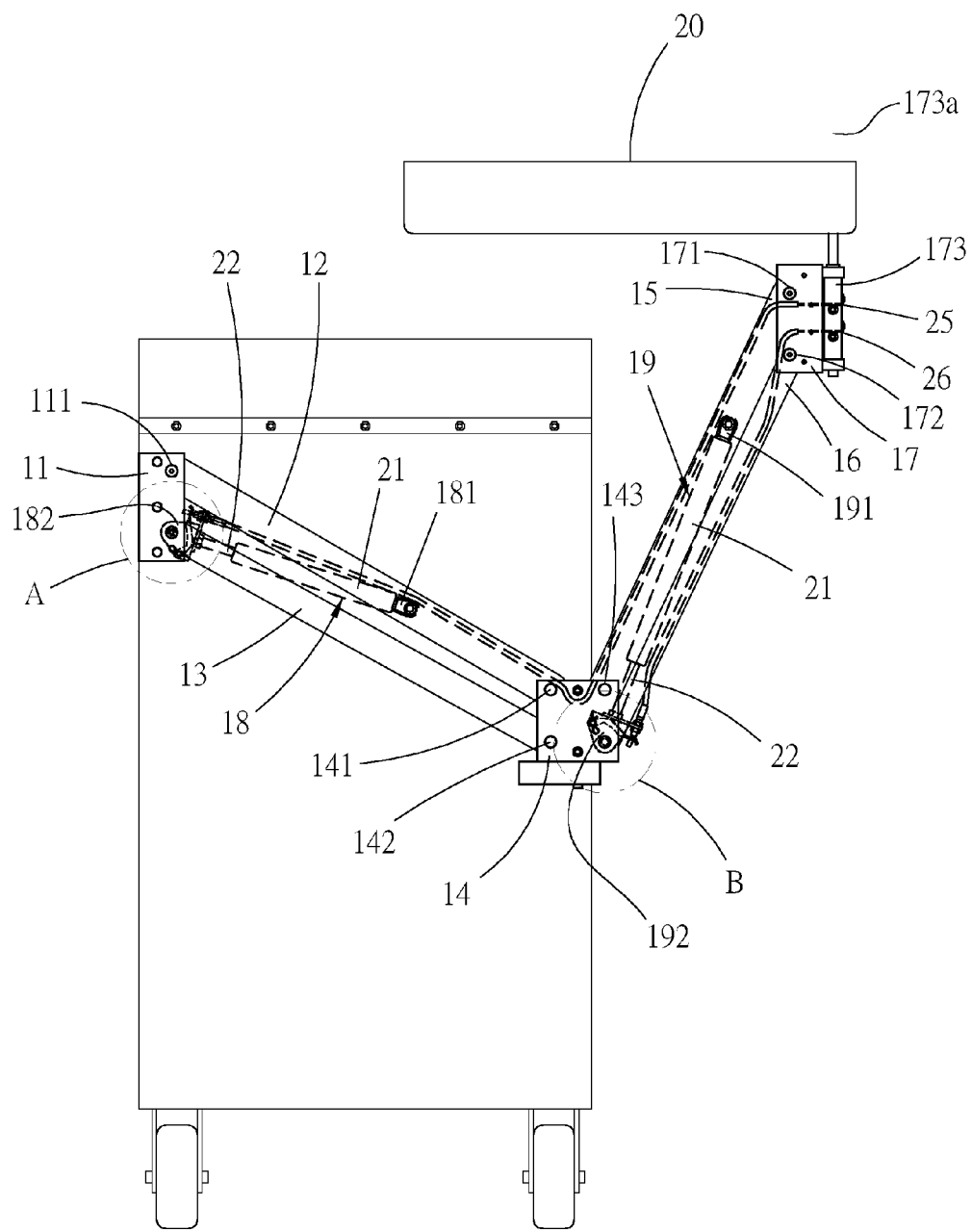
FIG. 2 is a front view according to FIG. 1, showing that the present invention is stretched and an activator is positioned in a first position.
Figure 2A:
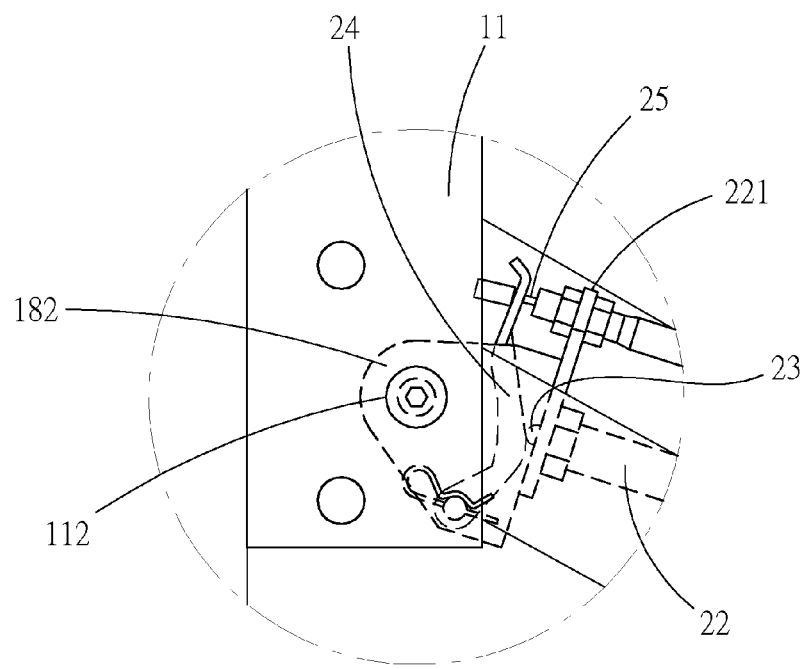
FIG. 2A is an enlarged view of circled area A of FIG. 2.
Figure 2B:
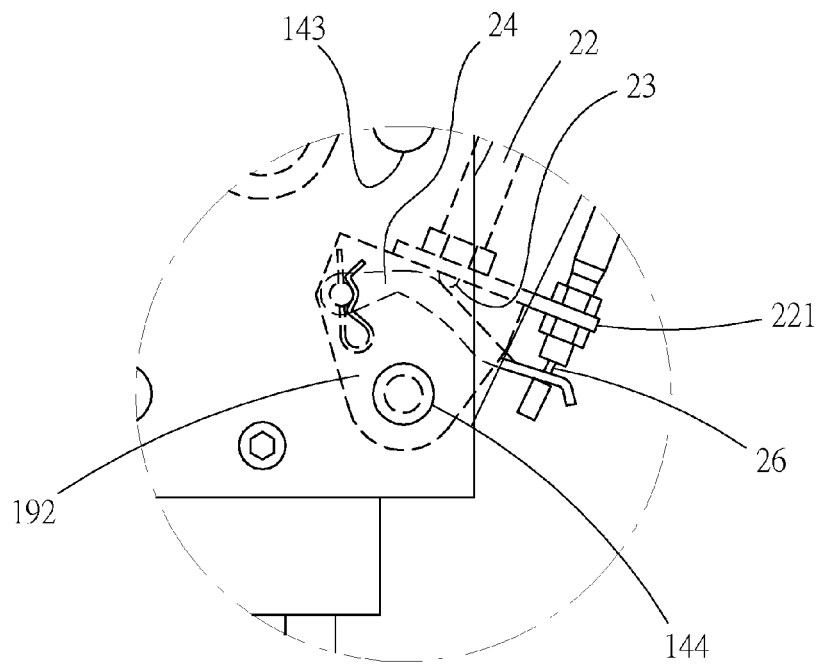
FIG. 2B is an enlarged view of circled area B of FIG. 2.
Figure 3:
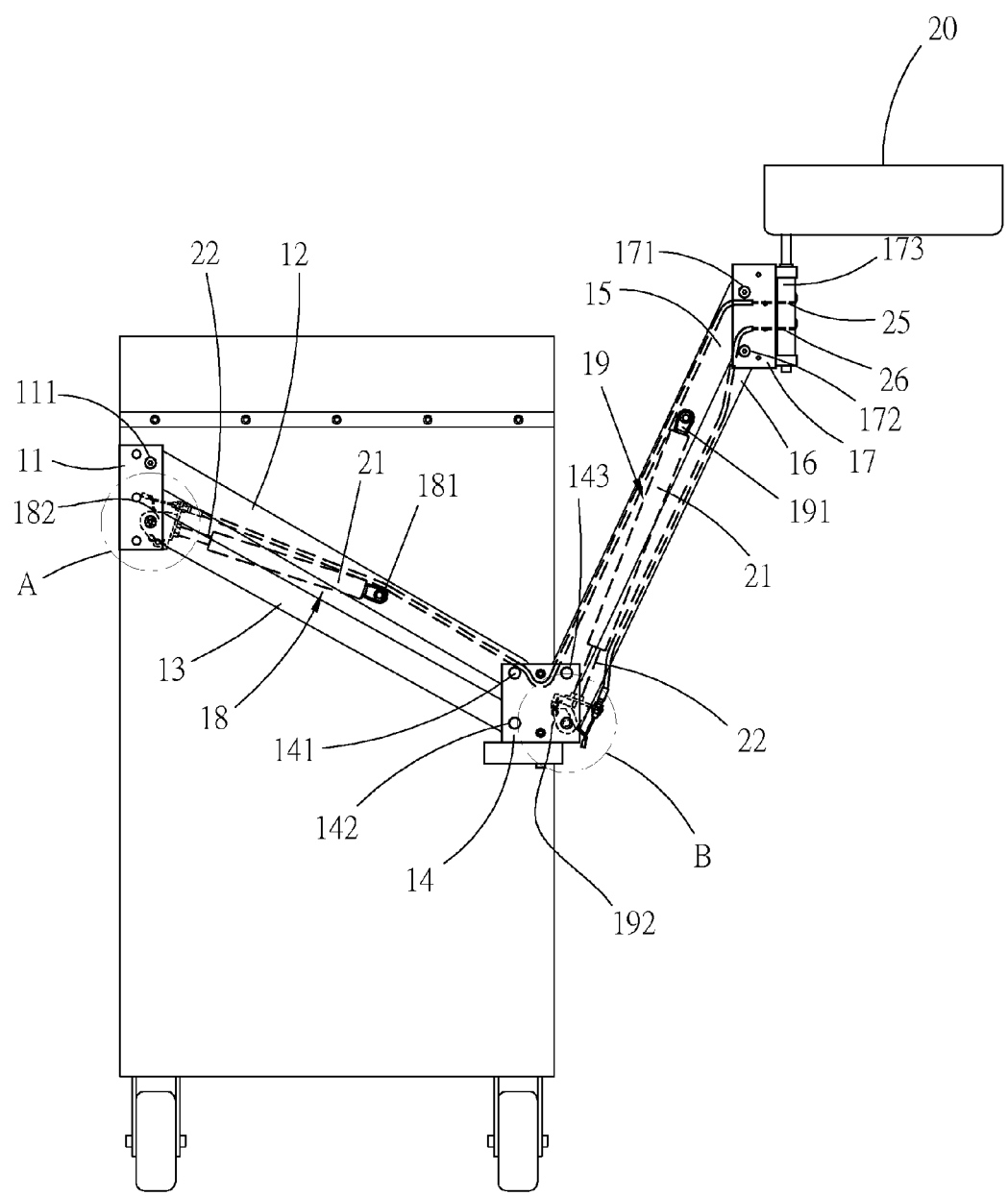
FIG. 3 is a front view according to FIG. 2, showing that the activator is positioned in a second position.
Figure 3A:
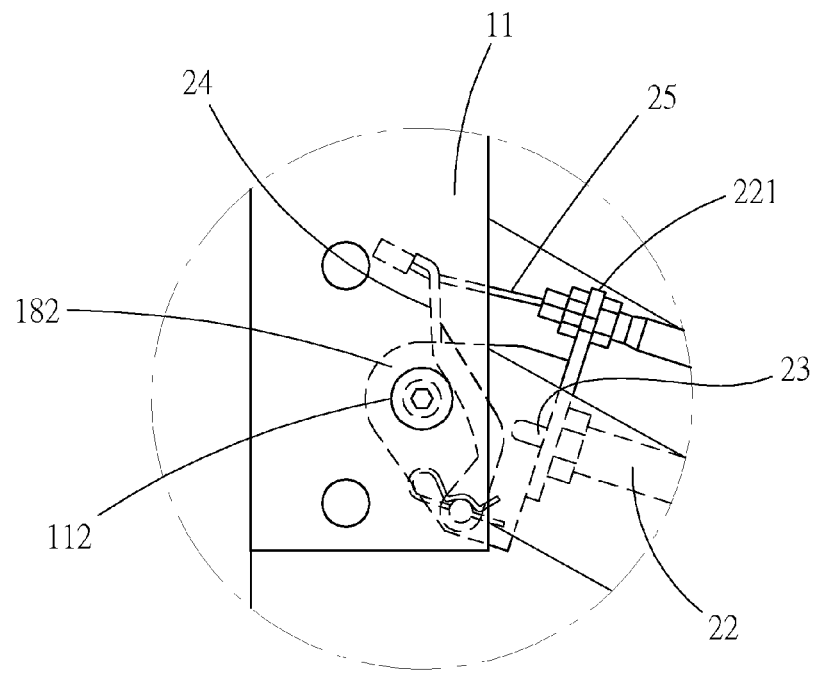
FIG. 3A is an enlarged view of circled area A of FIG. 3.
Figure 3B:
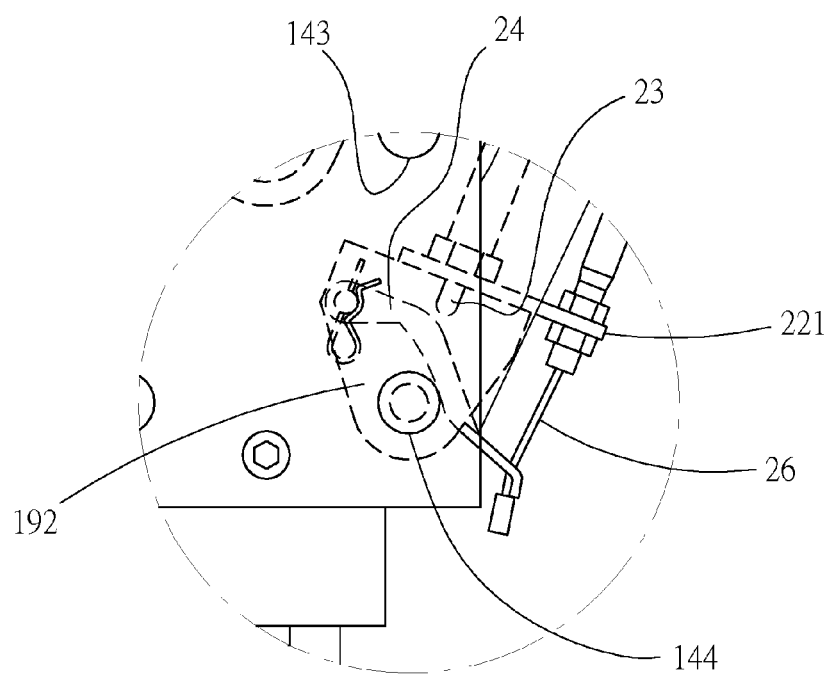
FIG. 3B is an enlarged view of circled area B of FIG. 3.

Please refer to FIGS. 1 to 6. The readily stretchable/contractible and locatable cantilever support of the present invention at least includes a fixed seat 11, a first link body 12, a second link body 13, a bridge seat 14, a third link body 15, a fourth link body 16, a movable seat 17, a first length telescopic adjustment device 18 and a second length telescopic adjustment device 19. The fixed seat 11 is fixedly disposed on a tool cabinet and the movable seat 17 is readily movable and locatable to get close to a working position. An article box 20 is disposed on the movable seat 17 for conveniently placing a tool or other articles therein. In addition, the fixed seat 11 can be fixedly disposed on a wall (not shown), whereby the present invention can be readily moved and located for conveniently placing a television, a screen or the like thereon.

The fixed seat 11 at least includes a first connection section 111 and a second connection section 112.

One end of the first link body 12 is pivotally connected with the first connection section 111 of the fixed seat 11.

One end of the second link body 13 is pivotally connected with the second connection section 112 of the fixed seat 11 in adjacency to the first link body 12.

The bridge seat 14 at least includes a third connection section 141, a fourth connection section 142, a fifth connection section 143 and a sixth connection section 144. The other end of the first link body 12 is pivotally connected with the third connection section 141 of the bridge seat 14. The other end of the second link body 13 is pivotally connected with the fourth connection section 142 of the bridge seat 14.

One end of the third link body 15 is pivotally connected with the fifth connection section 143 of the bridge seat 14.

One end of the fourth link body 16 is pivotally connected with the sixth connection section 144 of the bridge seat 14 in adjacency to the third link body 15.

The movable seat 17 at least includes a seventh connection section 171 and an eighth connection section 172. The other end of the third link body 15 is pivotally connected with the seventh connection section 171 of the movable seat 17. The other end of the fourth link body 16 is pivotally connected with the eighth connection section 172 of the movable seat 17.

The first, second, third, fourth, fifth, sixth, seventh and eighth connection sections 111, 112, 141, 142, 143, 144, 171, 172 can be perforations. In general, the pivotal connection can be achieved by a pin body passing through the perforations of two members and the ends of the pin body are riveted or threaded to pivotally connect the two members.

The present invention employs the currently commercially available gas elevation extension/retraction adjustment device or so-called gas spring or pneumatic bar. A piston rod is positioned in a tubular body having two chambers. The pressure difference between the two chambers makes the piston rod pushed to change the length. The often seen application of the gas spring in the market is such as the tailgate of an automobile or elevation chair.

The gas spring mounted on the elevation chair includes an insertion pin drivingly connected with a valve for locking or unlocking the piston rod so as to locate the elevation chair at a certain height. The lockable gas spring operates in such a manner that when a piston valve is opened (an insertion pin is pushed in or pulled out), a piston rod can be extended out or pushed in, and when the piston valve is closed (the insertion pin is not pushed in or pulled out), the piston rod is locked in a desired position.

In addition, an easy stop gas spring is also commercially available. The easy stop gas spring has an adjustable maintenance force, whereby the piston rod can be extended out or pushed in and stopped (not locked) in any position of the travel.

Two ends of the first length telescopic adjustment device 18 are respectively provided with a ninth connection section 181 and a tenth connection section 182. The ninth connection section 181 is pivotally connected with the first link body 12. The tenth connection section 182 is pivotally connected with the second connection section 112 of the fixed seat 11. The tenth connection section 182 can be alternatively pivotally connected with the second link body 13 or other part of the fixed seat 11. Two ends of the second length telescopic adjustment device 19 are respectively provided with an eleventh connection section 191 and a twelfth connection section 192. The eleventh connection section 191 is pivotally connected with the third link body 15. The twelfth connection section 192 is pivotally connected with the sixth connection section 144 of the bridge seat 14. The twelfth connection section 192 can be alternatively pivotally connected with the fourth link body 16 or other part of the bridge seat 14.

In the case that the first and second length telescopic adjustment devices 18, 19 of the present invention are the aforesaid easy stop gas springs, when a user applies a force to the movable seat 17 to move the same, the lengths of the first and second length telescopic adjustment devices 18, 19 are changed, that is, the position of the movable seat 17 is changed. At this time, after the user releases the movable seat 17, the movable seat 17 is located in a certain position. In the case that the user further applies a force to the movable seat 17, the movable seat 17 is further moved.

In the case that the first and second length telescopic adjustment devices 18, 19 of the present invention are the aforesaid lockable gas springs, when an insertion pin is pushed in, a piston valve is opened and a piston rod can be extended out or pushed in, and when the piston valve is closed (the insertion pin is not pushed in), the piston rod is locked in a desired position. Under such circumstance, the movable seat 17 can be further locked in a certain position. This is described hereinafter:

Each of the first and second length telescopic adjustment devices 18, 19 at least includes a cylinder 21, a telescopic rod 22, an insertion pin 23 and a press section 24. The movable seat 17 at least includes an activator 173.

The telescopic rod 22 is partially received in the cylinder 21. One end of the telescopic rod 22 extends out of the cylinder 21. The tenth connection section 182 and the twelfth connection section 192 are respectively disposed at the outer ends of the telescopic rods 22 of the first and second length telescopic adjustment devices 18, 19. The insertion pin 23 is disposed at the outer end of the telescopic rod 22 for controlling opening/closing of a piston valve (not shown) in the cylinder 21 and further controlling the relative motion between the telescopic rod 22 and the cylinder 21. One end of the press section 24 of each of the first and second length telescopic adjustment devices 18, 19 is respectively pivotally connected with the tenth connection section 182 and the twelfth connection section 192. The middle section of the press section 24 is aligned with the insertion pin 23.

The activator 173 is such as a cylindrical body rotatably disposed on one side of the movable seat 17 and rotatable between a first position and a second position about a vertical axis 173a. In this embodiment, the article box 20 is disposed above the activator 173 for rotating the activator 173. Alternatively, a shift member such as a lever body (not shown) can be disposed on the activator 173 for rotating the activator 173.

A first linking section 25 such as a steel cable is disposed between the first length telescopic adjustment device 18 and the activator 173. One end of the first linking section 25 passes through a plate body 221 of one end of the telescopic rod 22 of the first length telescopic adjustment device 18 to be connected with the other end of the press section 24 of the first length telescopic adjustment device 18. The other end of the first linking section 25 is connected with the activator 173 such as a screw fastening the first linking section 25. When the activator 173 is rotated and positioned in the first position, the activator 173 drives the first linking section 25 to pull the press section 24 of the first length telescopic adjustment device 18 and further press the insertion pin 23 of the first length telescopic adjustment device 18 to open a piston valve. In this case, the length of the first length telescopic adjustment device 18 can be changed. When the activator 173 is rotated and positioned in the second position, the activator 173 drives the first linking section 25 to release the press section 24 of the first length telescopic adjustment device 18 and further release the insertion pin 23 of the first length telescopic adjustment device 18 to close the piston valve. Under such circumstance, the length of the first length telescopic adjustment device 18 cannot be changed.

A second linking section 26 such as a steel cable is disposed between the second length telescopic adjustment device 19 and the activator 173. One end of the second linking section 26 passes through a plate body 221 of one end of the telescopic rod 22 of the second length telescopic adjustment device 19 to be connected with the other end of the press section 24 of the second length telescopic adjustment device 19. The other end of the second linking section 26 is connected with the activator 173 such as a screw fastening the second linking section 26. When the activator 173 is rotated and positioned in the first position, the activator 173 drives the second linking section 26 to pull the press section 24 of the second length telescopic adjustment device 19 and further press the insertion pin 23 of the second length telescopic adjustment device 19 to open a piston valve. In this case, the length of the second length telescopic adjustment device 19 can be changed. When the activator 173 is rotated and positioned in the second position, the activator 173 drives the second linking section 26 to release the press section 24 of the second length telescopic adjustment device 19 and further release the insertion pin 23 of the second length telescopic adjustment device 19 to close the piston valve. Under such circumstance, the length of the second length telescopic adjustment device 19 cannot be changed.

The present invention employs the lockable gas springs. Accordingly, when the activator 173 is rotated and positioned in the first position, the movable seat 17 can be readily moved to a certain position. When the activator 173 is rotated and positioned in the second position, the movable seat 17 is locked and cannot be moved. In practice, when the activator 173 is rotated and positioned in the first position and the movable seat 17 is not held by a user's hand, according to the drawings, the article box 20 can be driven back to the position on the top face of the tool cabinet.

The present invention employs the lockable gas springs. Accordingly, the lengths of the first and second linking sections 25, 26 between the press section 24 and the activator 173 can be adjusted to further adjust the press travel of the insertion pin 23 and further adjust the opening of the piston valve and further adjust the speed of relative motion between the first and second length telescopic adjustment devices 18, 19.

In the above lockable gas spring, the insertion pin 23 is pressed to open the piston valve. Alternatively, the insertion pin can be pulled out to open the piston valve to achieve the same effect. Alternatively, in one of the lockable gas springs, the insertion pin can be pulled out to open the piston valve, while in the other of the lockable gas springs, the insertion pin 23 is pushed in to open the piston valve. The first and second linking sections 25, 26 are connected with the activator 173 on two opposite sides thereof. This can also achieve the same effect.

The present invention includes two four-link mechanisms. In practice of use, the lengths of the first and second length telescopic adjustment devices 18, 19 will be changed at the same time or at different times. Alternatively, the length of one of the first and second length telescopic adjustment devices 18, 19 will be changed.

Figure 7:
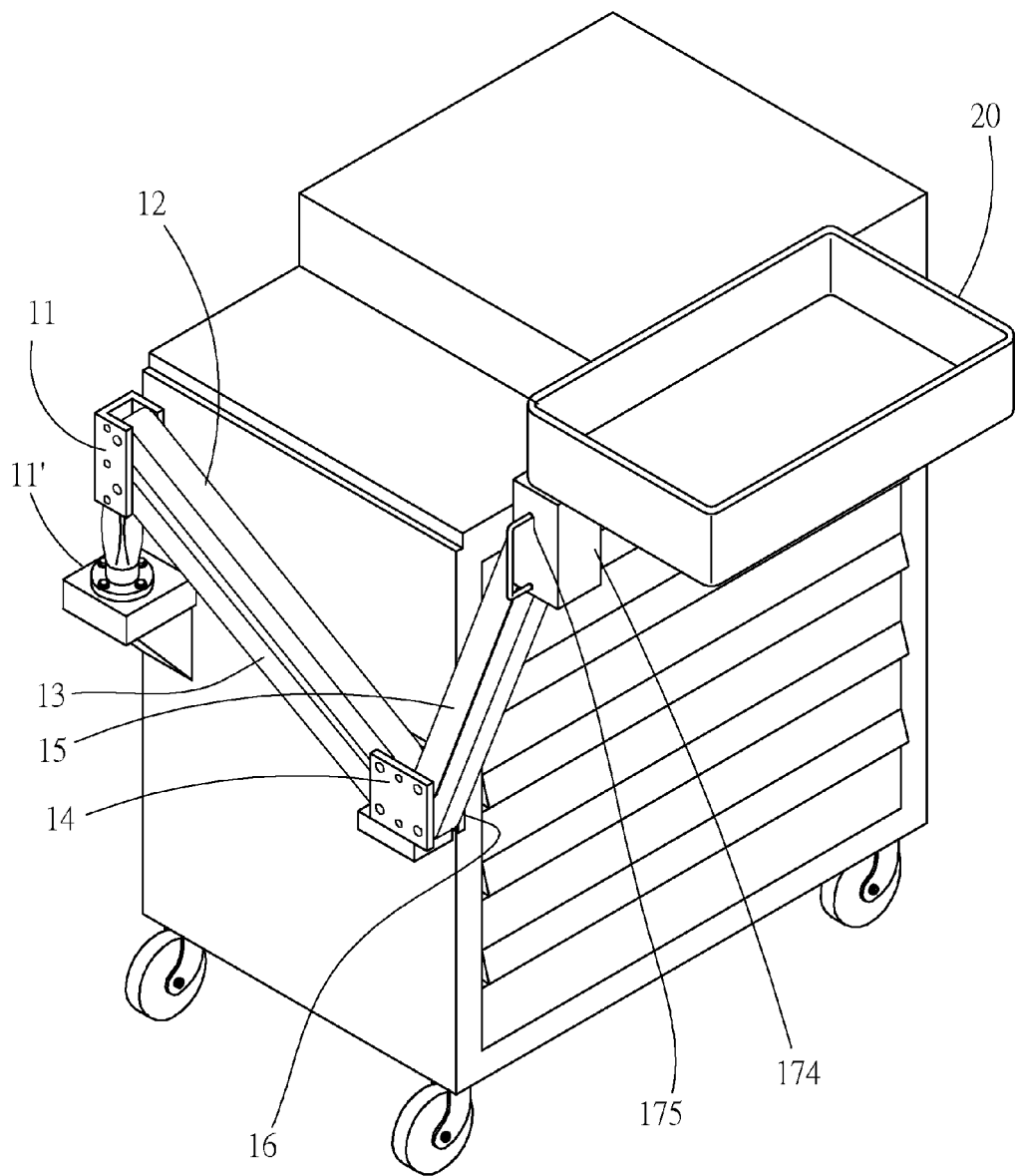
FIG. 7 is a perspective view of a second embodiment of the present invention in a stretched state.

Please now refer to FIG. 7. The readily stretchable/contractible and locatable cantilever support of the present invention further includes another fixed seat 11'. The fixed seat 11 is pivotally connected with the other fixed seat 11'. The other fixed seat 11' is further fixedly disposed on a tool cabinet or a wall. Accordingly, the present invention can be three-dimensionally moved to achieve higher utility. The lengths of the first and second length telescopic adjustment devices 18, 19 will be unchanged, if a user rotates the two four-link mechanisms.

The lines between the first, second, third and fourth connection sections 111, 112, 141, 142 define a quadrangle, which is a parallelogram. The lines between the fifth, sixth, seventh and eighth connection sections 143, 144, 171, 172 define a quadrangle, which is a parallelogram. When the movable seat 17 is moved and the first, second, third and fourth link bodies 12, 13, 15, 16 are relatively moved, the article box 20 disposed above the activator 173 is kept horizontal to achieve better utility.

Figure 4:
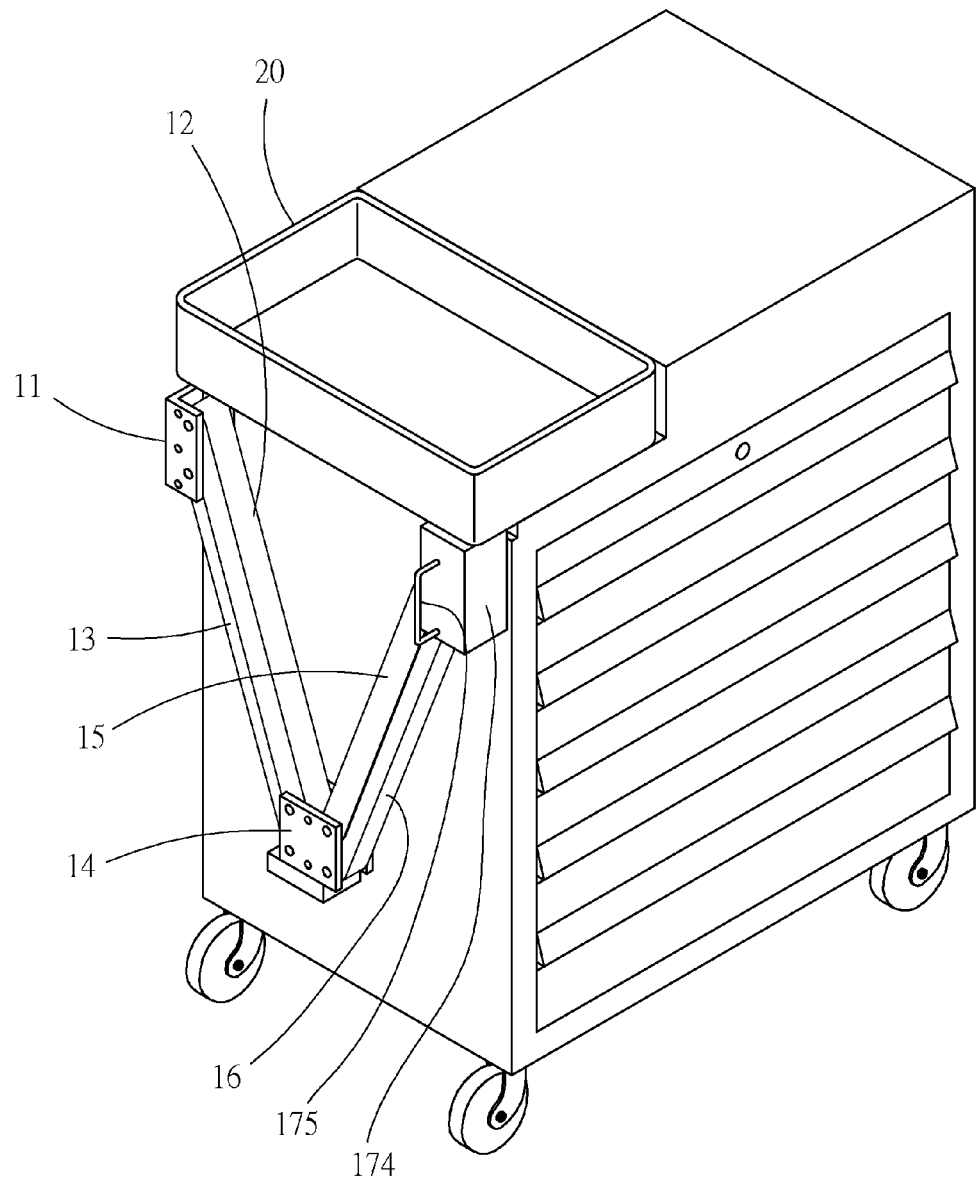
FIG. 4 is a perspective view of the first embodiment of the present invention according to FIG. 1, showing that an enclosure body and a handle are mounted on the present invention.
Figure 5:
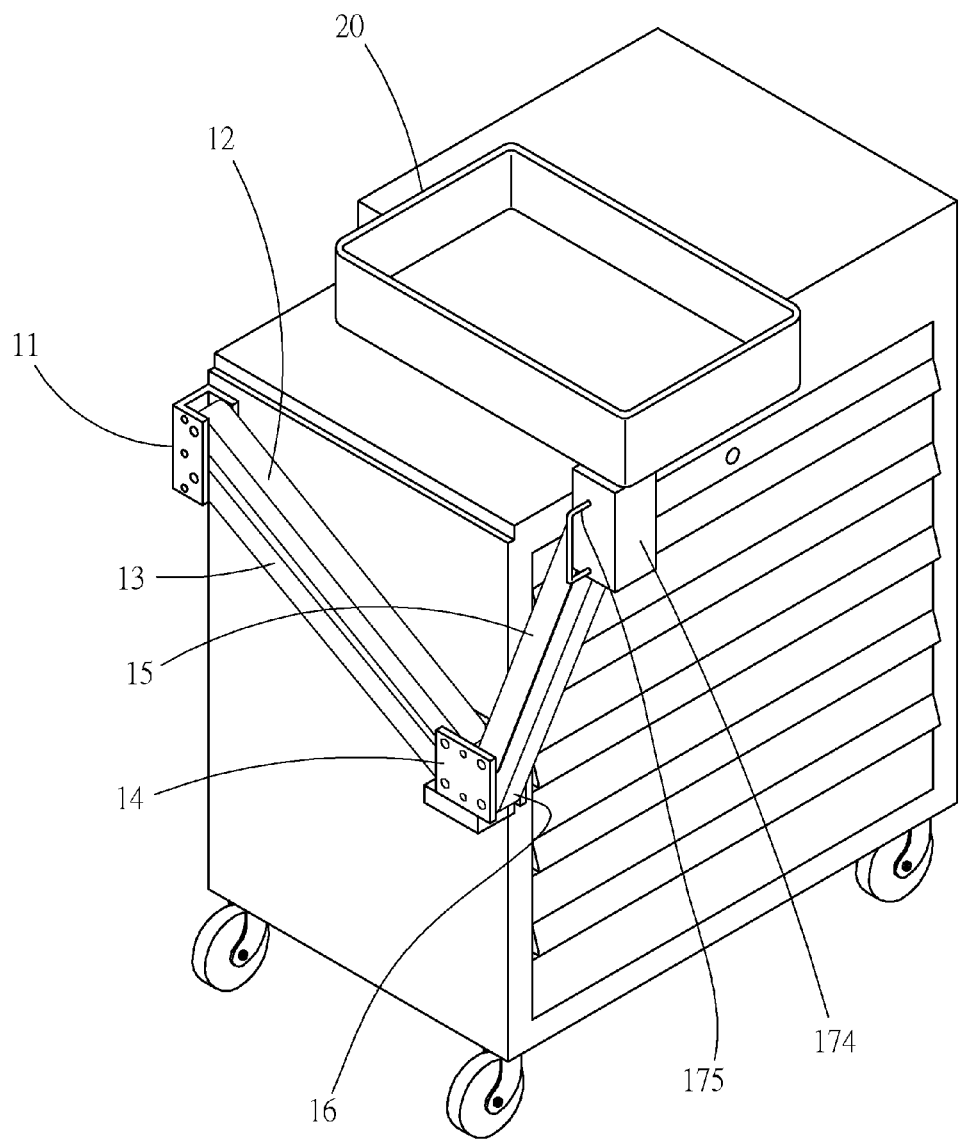
FIG. 5 is a perspective view of the first embodiment of the present invention according to FIG. 2, showing that an enclosure body and a handle are mounted on the present invention.
Figure 6:
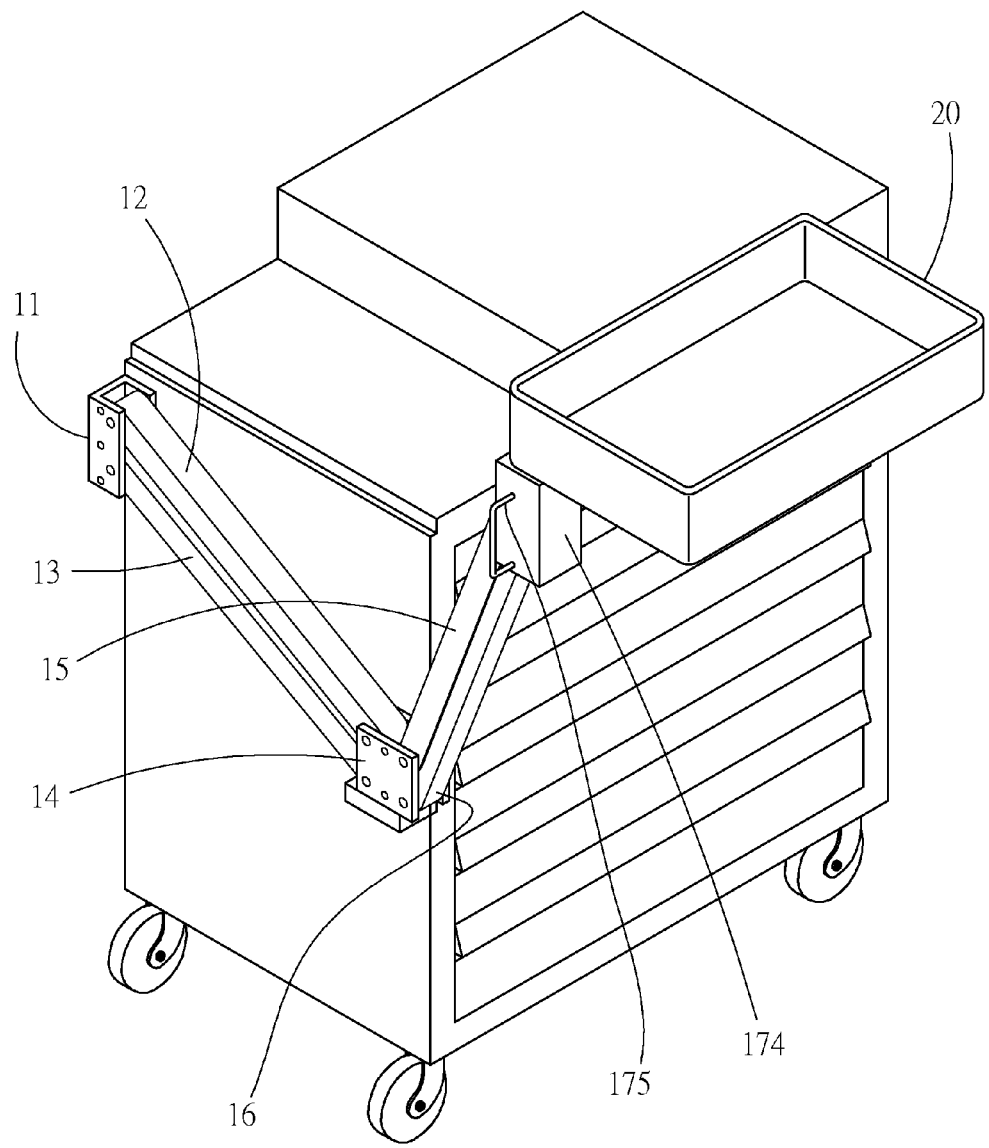
FIG. 6 is a perspective view of the first embodiment of the present invention in a stretched state, wherein the activator is positioned in the second position.

Please now refer to FIGS. 4, 5 and 6. In the readily stretchable/contractible and locatable cantilever support of the present invention, an enclosure 174 is further disposed around the movable seat 17 to beautify the appearance. A handle 175 is further disposed on outer side of the enclosure 174 for a user to conveniently force the movable seat 17.

The above embodiments are only used to illustrate the present invention, not intended to limit the scope thereof. Many modifications of the above embodiments can be made without departing from the spirit of the present invention.

What is claimed is:

1. A locatable cantilever support for a tool cabinet comprising:
   a fixed seat;
   a first link body, a first end of the first link body being pivotally connected with a first connection section of the fixed seat;
   a second link body, a first end of the second link body being pivotally connected with a second connection section of the fixed seat in adjacency to the first link body;
   a bridge seat, a second end of the first link body being pivotally connected with a third connection section of the bridge seat, a second end of the second link body being pivotally connected with a fourth connection section of the bridge seat;
   a third link body, a first end of the third link body being pivotally connected with a fifth connection section of the bridge seat;
   a fourth link body, a first end of the fourth link body being pivotally connected with a sixth connection section of the bridge seat in adjacency to the third link body;
   a movable seat, a second end of the third link body being pivotally connected with a seventh connection section of the movable seat, a second end of the fourth link body being pivotally connected with an eighth connection section of the movable seat;
   a first length telescopic adjustment device; and
   a second length telescopic adjustment device,
   two ends of the first length telescopic adjustment device being respectively provided with a ninth connection section and a tenth connection section, the ninth connection section being pivotally connected with the first link body and the tenth connection section being pivotally connected to the second link body or the fixed seat, two ends of the second length telescopic adjustment device being respectively provided with an eleventh connection section and a twelfth connection section, the connection section being pivotally connected with the third link body and the twelfth connection section being pivotally connected to the fourth link body or the bridge seat, whereby when a force is selectively applied to the movable seat, the lengths of the first and second length telescopic adjustment devices being simultaneously changed;

wherein each of the first and second length telescopic adjustment devices includes at least a cylinder, a telescopic rod, an insertion pin and a press section, the movable seat at least including an activator, wherein each of the telescopic rods being partially received in the respective cylinders, such that an outer end of each of the telescopic rods extending out of the respective cylinders, the tenth connection section being disposed at the outer end of the telescopic rod of the first length telescopic adjustment device, the twelfth connection section being disposed at the outer end of the telescopic rod of the second length telescopic adjustment device, each of the insertion pins being disposed at the outer end of the respective telescopic rods for controlling relative motion between the telescopic rod and the cylinder, a first end of the press section of each of the first and second length telescopic adjustment devices being respectively pivotally connected with the tenth connection section and the twelfth connection section, a middle section of the press section being aligned with the insertion pin; wherein the activator being swingably disposed on the movable seat and swingable between a first position and a second position, a first linking section being disposed between the first length telescopic adjustment device and the activator, a first end of the first linking section being connected with a second end of the press section of the first length telescopic adjustment device, a second end of the first linking section being connected with the activator, a second linking section being disposed between the second length telescopic adjustment device and the activator, a first end of the second linking section being connected with a second end of the press section of the second length telescopic adjustment device a second end of the second linking section being connected with the activator, wherein, when the activator is located in the first position, the activator is configured to drive the first linking section, press the press section of the first length telescopic adjustment device and press the insertion pin of the first length telescopic adjustment device, the activator is configured to drive the second linking section, press the press section of the second length telescopic adjustment device and press the insertion pin of the second length telescopic adjustment device, and the length of the first length telescopic adjustment device, and the length of the second length telescopic adjustment device are unlocked and simultaneously adjustable, wherein, when the activator is located in the second position, the activator is configured to drive the first linking section, release the press section of the first length telescopic adjustment device and release the insertion pin of the first length telescopic adjustment device, the activator is configured to drive the second linking section release the press section of the second length telescopic adjustment device and release the insertion pin of the second length telescopic adjustment device such that the length of the first length telescopic adjustment device and the length of the second length telescopic adjustment device are locked in a desired position;

wherein the activator is rotatably disposed on the movable seat and rotates about a vertical axis, an article box being disposed at one end of the activator for receiving an article and rotating the activator.

2. The locatable cantilever support for the tool cabinet as claimed in claim 1, further comprising another fixed seat, the fixed seat being pivotally connected with the other fixed seat.

3. The locatable cantilever support for the tool cabinet as claimed in claim 2, wherein the first and second linking sections are steel cables.

4. The locatable cantilever support for the tool cabinet as claimed in claim 2, wherein a plurality of lines between the first, second, third and fourth connection sections define a quadrangle, which is a parallelogram.

5. The locatable cantilever support for the tool cabinet as claimed in claim 2, wherein a plurality of lines between the fifth, sixth, seventh and eighth connection sections define a quadrangle, which is a parallelogram.

6. The locatable cantilever support for the tool cabinet as darned in dam 1, wherein the first and second linking sections are steel cables.

7. The locatable cantilever support for the tool cabinet as darned in dam 1, wherein a plurality of lines between the first, second, third and fourth connection sections define a quadrangle, which is a parallelogaram.

8. The locatable cantilever support for the tool cabinet as claimed in claim 1, wherein a plurality of lines between the fifth, sixth, seventh and eighth connection sections define a quadrangle, which is a parallelogram.

* * * * *